United States Patent
Love et al.

(10) Patent No.: US 12,430,640 B1
(45) Date of Patent: Sep. 30, 2025

(54) HYBRID CONTROL OF DIGITAL ASSET PRIVATE KEYS

(71) Applicant: TrofiVentures LLC, Austin, TX (US)

(72) Inventors: Blake Love, Austin, TX (US); Tiago Soromenho, Austin, TX (US); Michael (Mike) Love, Austin, TX (US)

(73) Assignee: TrofiVentures LLC, Austin, TX (US)

( * ) Notice: Subject to any disclaimer, the term of this patent is extended or adjusted under 35 U.S.C. 154(b) by 0 days.

(21) Appl. No.: 19/196,953

(22) Filed: May 2, 2025

Related U.S. Application Data (63) Continuation of application No. 18/953,851, filed on Nov. 20, 2024.

(60) Provisional application No. 63/721,409, filed on Nov. 15, 2024.

(51) Int. Cl.
| | |
|---|---|
| *G06Q 20/38* | (2012.01) |
| *G06Q 20/36* | (2012.01) |
| *G06Q 20/40* | (2012.01) |
| *H04L 9/00* | (2022.01) |
| *G06F 21/62* | (2013.01) |

(52) U.S. Cl.
CPC ....... *G06Q 20/3829* (2013.01); *G06Q 20/367* (2013.01); *H04L 9/00* (2013.01); *G06F 21/62* (2013.01); *G06Q 20/405* (2013.01)

(58) Field of Classification Search
CPC ............. G06Q 20/3829; G06Q 20/367; G06Q 20/405; H04L 9/00; G06F 21/61
USPC ......................................................... 705/75
See application file for complete search history.

(56) References Cited

U.S. PATENT DOCUMENTS

| | | | |
|---|---|---|---|
| 11,770,263 B1* | 9/2023 | Singh | H04L 9/3247 |
| | | | 713/168 |
| 11,915,314 B2* | 2/2024 | Di Nicola | G06Q 40/04 |
| 12,047,493 B2* | 7/2024 | Sunkavally | H04L 9/321 |
| 2019/0007205 A1* | 1/2019 | Corduan | H04L 9/0825 |
| 2023/0344641 A1* | 10/2023 | Heart | H04L 9/50 |
| 2025/0045744 A1* | 2/2025 | Huang | H04L 63/0428 |

OTHER PUBLICATIONS

Almadani "An AI-Drive, Secure, and Trustworthy Ranking System for Blockchain-Based Wallets", University of Technology Sydney, Apr. 2024, 184 pages (Year: 2024).*

* cited by examiner

*Primary Examiner* — James D Nigh
(74) *Attorney, Agent, or Firm* — Gabriel & Co; Andrew M. Gabriel (57) ABSTRACT

An embodiment provides for private key management for digital assets. A method provides a hosted digital wallet that mirrors at least a portion of data of a user digital wallet. The hosted digital wallet includes first data indicative of a first portion of a private key. The hosted digital wallet is associated with a smart contract storing second data indicative of at least the remainder of the private key that is not the first portion of the private key stored in the hosted digital wallet. It is determined that the user digital wallet is not compliant with condition(s) specified via the smart contract, a response to a third-party request is obtained prior to releasing the remainder, and the data indicative of the second portion of the private key is obtained from the smart contract, recovering the private key using the first data and second data.

20 Claims, 7 Drawing Sheets

HYBRID CONTROL OF DIGITAL ASSET PRIVATE KEYS

CROSS REFERENCE TO RELATED APPLICATIONS

This application is a continuation of U.S. patent application Ser. No. 18/953,851, filed Nov. 20, 2024, which in turn claims priority to U.S. provisional patent application Ser. No. 63/721,409, filed Nov. 15, 2024, each having the same title as the present application, the contents of which are incorporated by reference herein in their entirety.

BACKGROUND

1. Field

The disclosed subject matter generally pertains to managing keys used for securing digital assets.

2. Description of the Related Art

Digital wallets such as those used for cryptocurrency store the private key(s) which are the only access to digital assets. Generally, a user must retain a password or phrase to access the wallet to obtain the key(s) stored in the wallet. In such cases, the digital wallet may be referred to as a self-custody wallet because the user is responsible for the wallet, including managing and retaining availability of the password or phrase. If the password or phrase is lost, for example if the user loses it, the password or phrase is not available and therefore nor are the key(s) which prove ownership of the digital assets.

SUMMARY

In summary, an embodiment provides a method, comprising: providing, using a set of one or more processors, a hosted digital wallet that mirrors at least a portion of data of a user digital wallet, the hosted digital wallet comprising first data indicative of a first portion of a private key; associating, using the set of one or more processors, the hosted digital wallet with a smart contract storing second data indicative of at least the remainder of the private key that is not the first portion of the private key stored in the hosted digital wallet; determining, using the set of or more processors, that the user digital wallet is not compliant with one or more predetermined conditions specified via the smart contract; obtaining, using the set of or more processors, the data indicative of the second portion of the private key from the smart contract; and recovering, using the set of or more processors, the private key using the first data and second data.

In an embodiment, the recovering is performed after an expiration time of the smart contract. In an embodiment, the method includes providing data to the hosted digital wallet indicating a request to use one or more second assets prior to an expiration time of the smart contract associated with one or more first assets of the user digital wallet. In an embodiment, the method includes providing the one or more second assets prior to the expiration time of the smart contract. In an embodiment, the one or more first assets and the one or more second assets are different asset types. In an embodiment, the one or more first assets are data proving ownership of a type of cryptocurrency. In an embodiment, the method includes recovering the one or more first assets into the hosted digital wallet after the expiration time of the smart contract. In an embodiment, the determining that the user digital wallet is not compliant with one or more predetermined conditions specified via the smart contract comprises determining that a predefined communication is not received. In an embodiment, the determining that a predefined communication is not received indicates the user digital wallet is inaccessible. In an embodiment, the user digital wallet is inaccessible due to an inability to obtain a copy of the private key.

An embodiment provides a system comprising components such as a hosted digital wallet and programs or parts thereof that implement smart contract functionality, some of which may be stored and executed on a distributed ledger. In an embodiment, the system comprises a set of one or more processors and executable code stored in a non-transitory storage medium, the executable code being used by the set of one or more processors to perform one or more of the methods, or part thereof, as described herein.

An embodiment provides a computer program product comprising a non-transitory computer readable medium comprising code configurable to be executable by a set of one or more processors to perform one or more of the methods, or part thereof, as described herein.

The foregoing is a summary and thus may contain simplifications, generalizations, and omissions of detail; consequently, those skilled in the art will appreciate that the summary is illustrative only and is not intended to be in any way limiting.

These and other features and characteristics of the example embodiments, as well as the methods of operation and functions of the related elements of structure and the combination thereof, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of a claimed invention.

DETAILED DESCRIPTION OF EXAMPLE EMBODIMENTS

The described features, structures, or characteristics of the example embodiments may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well known structures, materials, or operations are not shown or described in detail to avoid obfuscation.

To address the problem of lost access, conventional solutions include recovery service providers who simply offer password recovery solutions similar to those used to access conventional digital accounts. A problem with this approach is that the recovery service may have access to user private information associated with the digital wallet, for example access to the entire password key, directly or indirectly. Thus, while offering a convenience of recoverability, there is an added security risk in that trust is placed in the password recovery service that can be circumvented, for example through hacking.

An embodiment therefore provides a solution to digital wallet password recovery and access in the form of hybrid custody for the data required to access the wallet or prove ownership of the associated assets, for example a password, referred to herein as a "private key." The private key is split into parts which are placed into trusted storage under the control of different parties. In an embodiment, a service provider offering a hosted wallet only has access to part, but not all, of a user's wallet private key, with the other part stored in a smart contract on a blockchain. This adds additional security over conventional passwords in two ways: 1) if someone finds or hacks the password to the smart contract, they only have access to part of the wallet private key; and 2) if the password is lost or can no longer be accessed, the smart contract can be constructed to release the part under certain condition(s) specified by the smart contract. By way of example, a first part of a key may be retained by a hosted wallet provided by a service provider. A second part of the key may be placed into a smart contract, recorded on a distributed ledger. The smart contract will conditionally release the second part of the key, allowing it to be combined with the first part, for recovery of the full key. The smart contract releases the second part of the key under specific conditions, for example expiration time of the contract, a period of non-refresh of the contract, a provided termination secret known only to the user, a release secret known only to a third party, etc. Thus, via numerous techniques, if a digital wallet is inaccessible, its private key may be recovered. Note that the smart contract may or may not have a component requiring the service provider to confirm its identity in some manner.

The description now turns to the figures. The illustrated example embodiments will be best understood by reference to the figures. The following description is intended only by way of example, and simply illustrates certain example embodiments.

Figure 1:
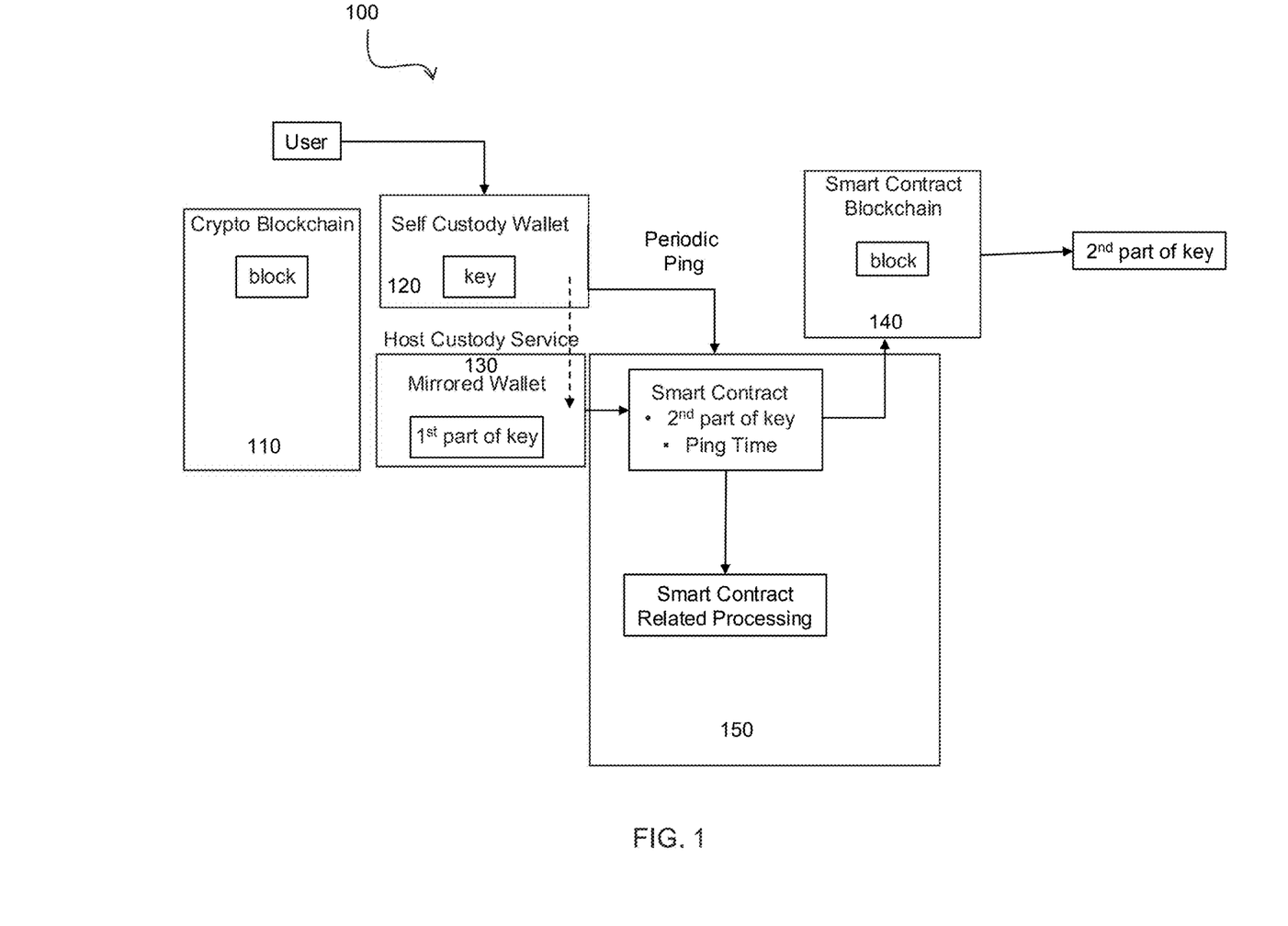
FIG. 1 illustrates an example system according to an embodiment.

Illustrated in FIG. 1 is an example system 100 and components that may be included in an embodiment or interacted with according to an embodiment. System 100 includes a self-custody wallet 120, for example a digital wallet, stored on a user device such as a mobile computing device, containing the access keys used to prove identity to crypto assets stored on a blockchain 110. Self-custody wallet 120 may be accessed via a private key, facilitating control of the crypto assets. Self-custody wallet 120 may have additional features, such as providing intermittent messages that indicate the user(s) are "alive" or that self-custody wallet 120 is on a computer that is operational. In an embodiment, self-custody wallet 120 sends an SMS message to a list of user(s) and if one user responds then an alive message is sent by self-custody wallet 120. In another embodiment, a third-party service tracks use of services, for example banking or credit cards, that indicate the user is alive, allowing the third-party service to act as a proxy for responding to a request from self-custody wallet 120 and so not bothering the user. In yet another embodiment, use of a host custody service such as described below may be able to act as a proxy and respond to a request from self-custody wallet 120.

In an embodiment, a host custody service may provide a mirrored wallet 130, also referred to herein as a hosted digital wallet or hosted-custody digital wallet, signifying that the host custody service controls content of the mirrored wallet 130. As illustrated, mirrored wallet 130 may include a first part of the private key of self-custody wallet 120. In some embodiments, the encrypted self-custody wallet 120 can also be stored as part of the mirrored wallet 130 as part of a backup service. This can be done with no risk, since the backup wallet can only be accessed with the full private key, of which only part is stored in the mirrored wallet 130.

Host custody service may include a processing component 150 that facilitates formation and transmission of a smart contract added to a smart contract blockchain 140. The smart contract is recorded as a block in smart contract blockchain 140. Processing component 150 provides an interface to the smart contract and related functions, as further described herein. In an embodiment illustrated in FIG. 1, the smart contract may be configured with one or more conditions, such as ping timing as well as the second part of the private key. As such, the smart contract may be configured to determine, for example periodically or intermittently, whether the owner(s) of the self-custody wallet 120 is alive. For example, ping messages or responses to ping messages should be received from self-custody wallet 120 per requirements of the smart contract. In the event a ping message or response is not obtained the smart contract is configured to release the second part of the private key, allowing it to be joined with the first part of the private key to recover or access the digital assets in self-custody wallet 120. In an embodiment, the lack of a ping message or response triggers a programmable sequence of steps before the second part of the private key is released, such as repeating the ping test or waiting for a pre-determined length of time. As will be appreciated, there are a variety of ways to establish communications or pings to determine if self-custody wallet 120 is compliant with the smart contract, for example implementing reporting or responding functionality in self-custody wallet 120.

Figure 2:
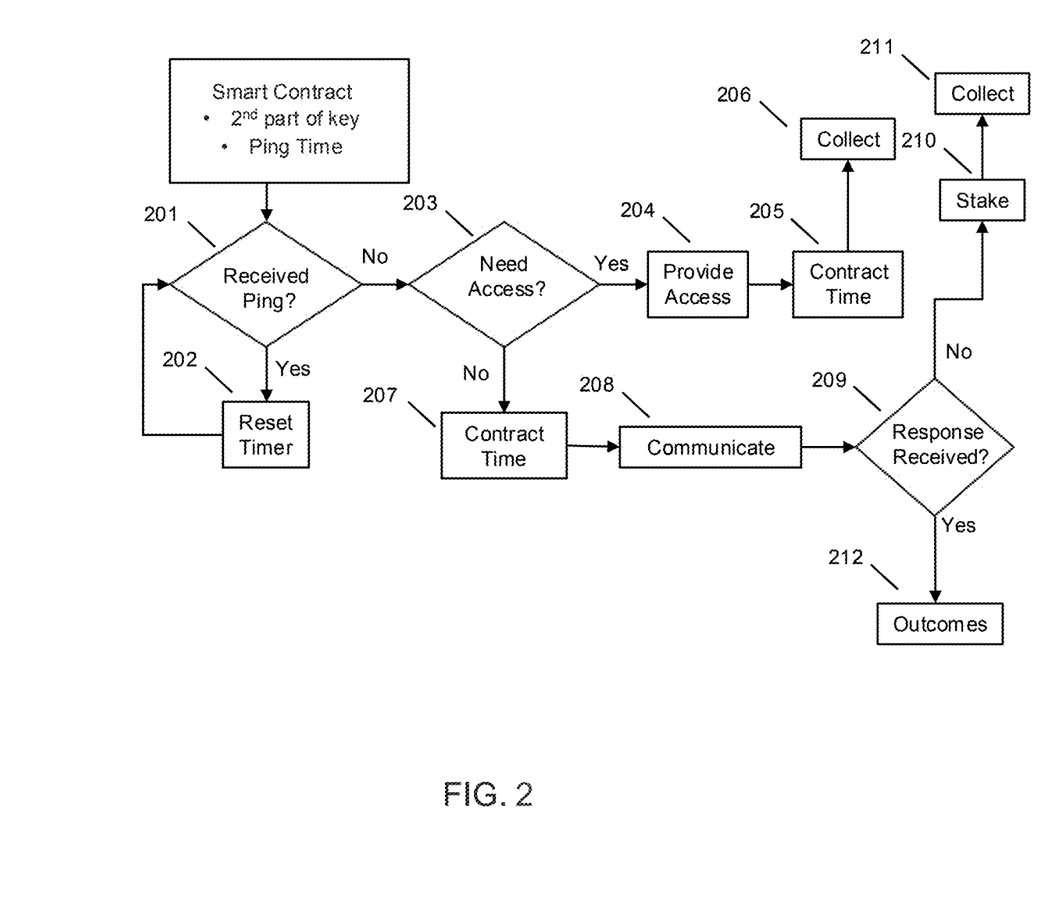
FIG. 2 illustrates an example method according to an embodiment.

Referring to FIG. 2, an example of processing related to a smart contract, for example implemented using processing component 150, is illustrated. In FIG. 2, a smart contract stores logic, e.g., setting forth conditions such as ping time or expiry rules, and stores the part of the private key of a self-custody wallet 120. In an embodiment, the smart contract or an off-chain application associated therewith is used to determine if a ping message is received at 201. It is noted that "ping message" is used as a term to indicate an agreed upon data communication utilized to determine a compliance with the smart contract, for example accessibility of a self-custody wallet 120 or "alive" status of a user of self-custody wallet 120. The ping message may take a variety of formats such as JSON, XML, etc. The rules of timing or frequency for ping messages may be agreed and configured using processing component 150, such as regular reporting according to a schedule, response to another condition, etc. If a ping message is received, the smart contract proceeds, the ping timing is reset at 202, and no action is required, i.e., all is well and self-custody wallet 120 remains accessible to its owning user. Further the smart contract may have an expiry condition that if all ping messages were received and no changes over a period, the smart contract expires, requiring a new contract. In another embodiment, there may be a "lock-out" condition that locks access to the part of the private key stored in the smart contract for a per-determined time after receipt of a ping message.

In contrast, as shown in FIG. 2, the ping message not being received at 201 is indicative of a potential issue with self-custody wallet 120, i.e. the wallet is inaccessible and the private key is deemed lost. As shown, if an authorized user requires access, as determined at 203, a variety of processing options may be conditionally utilized and lead to various outcomes, some of which are described to illustrate the varying possibilities.

As shown in FIG. 2 at 203, it may be determined that an authorized user needs access following a specific communication to the user, for example sending an email to the user at an agreed upon time after missing a ping. If the authorized user needs immediate access but is locked-out because they have to wait for the smart contract to expire, the host service provider may provide, as indicated at 204, alternative or different assets, such as fiat money in place of a digital asset of self-custody wallet 120, using the digital asset (which is guaranteed to be released at a future time) as security. By way of example, a smart contract or related logic may set forth that a discounted value of fiat currency may be obtained in exchange for forfeit of one or more of the digital assets of self-custody wallet 120. In one example, a discounted rate or percentage of fiat money (fiat currency) is provided at 204. Following the providing at 204, the expiration time of the smart contract is reached as indicated at 205 and the host custody service may collect 206 the original digital assets of self-custody wallet 120 by virtue of release of the second part of the key, allowing the full key of self-custody wallet 120 to be recovered. In an embodiment, the smart contract may be configured to expire early in the case where the advanced, alternative asset is provided to the user on proof of the fiat money transfer.

Alternatively, if the user does not need early access as determined at 203, the contract time of the smart contract will expire at the predetermined time, as shown at 207, and a communication may be made with an authorized user, as shown at 208. The communication at 208 may include informing the user that although no pings were received and while the continued availability of the self-custody wallet cannot be confirmed, the user is given a chance to select from options for handling the expiration of the smart contract. If no response is received, as determined at 209, the digital assets may be utilized as abandoned assets, for example staked at 210 and used to collect against, as indicated at 211. Alternatively, if a response from the user is forthcoming, one of a variety of outcomes could be used, as indicated at 212. Examples of outcomes 212 include, but are not limited to, renewing the smart contract, terminating the smart contract and removing the first part of the key from the hosted custody wallet such that the user may liquidate the assets or otherwise handle the self-custody wallet as desired with no further involvement of hosted custody service, and converting to full hosting where the full private key is stored in mirrored custody wallet 130.

Figure 2A:
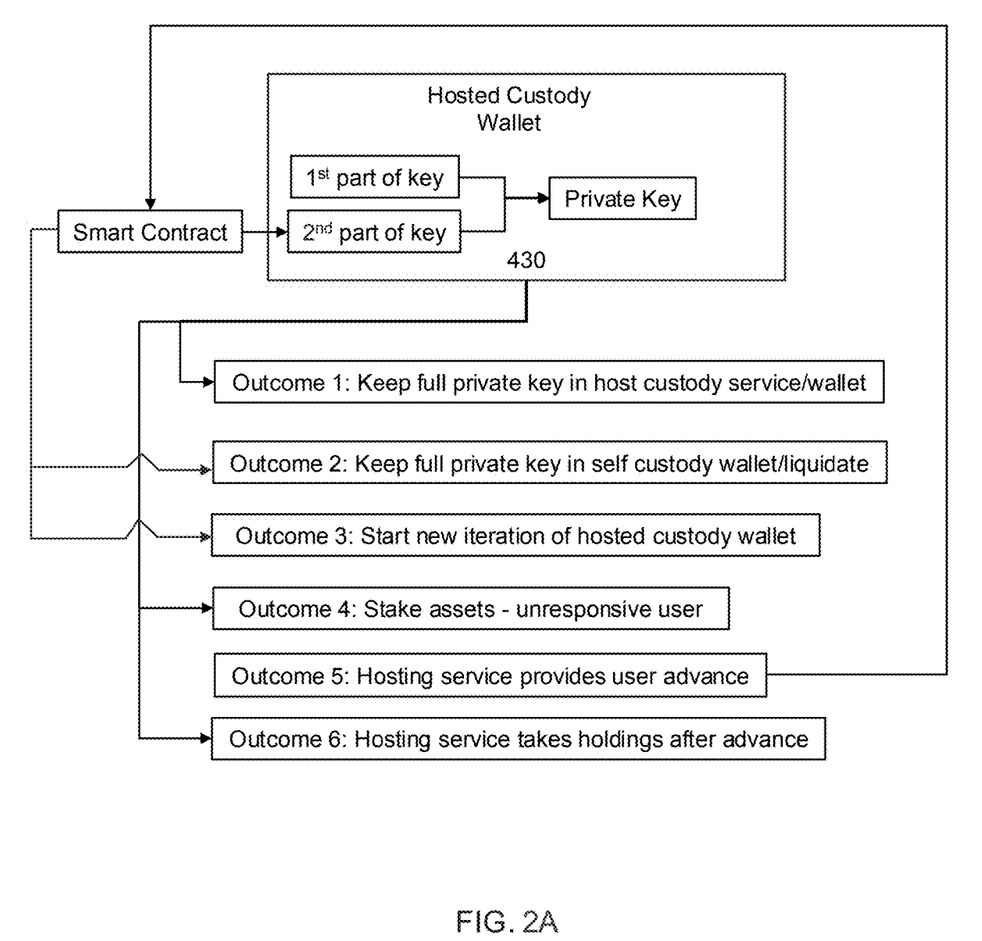
FIG. 2A illustrates example outcomes according to an embodiment.

To illustrate, and referring to FIG. 2A, the smart contract may be configured to release the second part of the key in defined circumstances, allowing the hosted custody wallet 430 to obtain the other part of the private key. Alternatively, or additionally, the smart contract may be configured to not permit the release of the second part of the key under any conditions, for example the user wishes to stop using hosted custody wallet 430 or the user wishes to use a different smart contract.

By way of example, at the end of the smart contract the second part of the private key may be released and may be joined with the first part of the key to form the full private key by hosted custody wallet 430. In the examples illustrated in FIG. 2A, the full key is recovered and stored in hosted custody wallet 430, which corresponds to outcomes 1, 4 and 6 in the FIG. 2A. However, other outcomes may be utilized, as illustrated, including the providing of the full key to self-custody wallet, outcome 2, in which case the host custody service provider does not acquire the second part of the key, as the smart contract is configured to not provide the full key to hosted custody wallet 430. Also illustrated is that the smart contract may be renewed in outcome 3, which again may be facilitated by smart contract logic and again does not make the second part of key available to hosted custody wallet 430.

In another example outcome, the digital assets in mirrored wallet 130 in outcome 4 may be considered abandoned and used by the host custody provider, such as for staking prior to contract expiry. In such a case, the second part of the key is provided to hosted custody wallet 430 for full key recovery after expiration of the smart contract.

As an additional example, the host custody provider may provide an advance for access to the digital assets, such fiat money payment at a discount (outcome 5), followed by the host custody service obtaining the second part of the key at smart contract expiration and collecting the original digital assets using the second part of the key (outcome 6).

Figure 3:
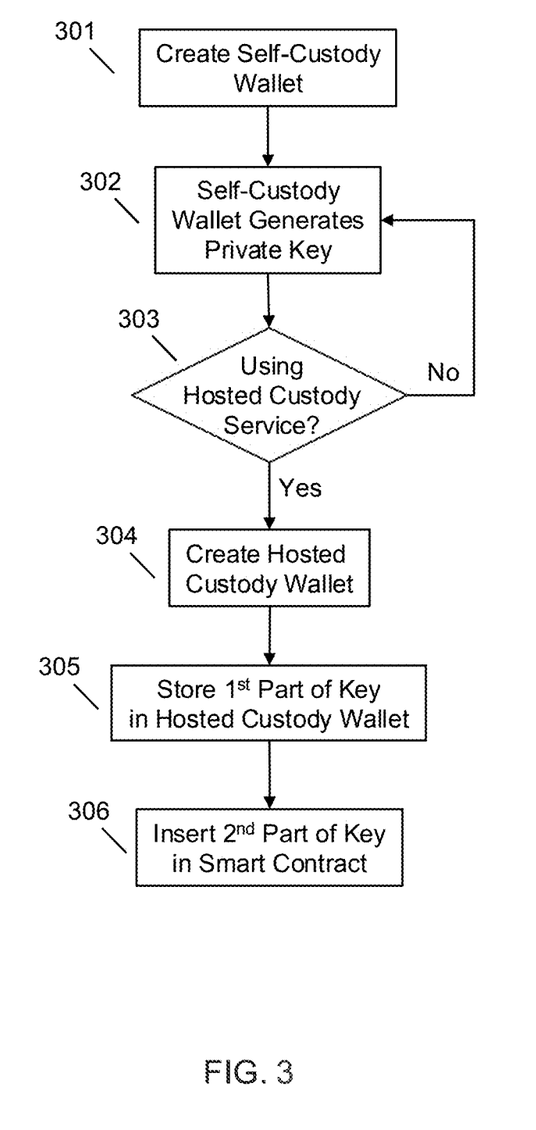
FIG. 3 illustrates an example method according to an embodiment.

FIG. 3 illustrates an example set up procedure for using a host custody service. In the example of FIG. 3, a user creates a self-custody wallet at 301, for example by installing a mobile application. A self-custody wallet generates a private key, as illustrated at 302, which encrypts and secures the key to digital assets added to the self-custody wallet such as cryptocurrency in a blockchain. Note that in an embodiment, the wallet may have only one asset, in which case the private key may the same as the secured key. Generating the private key may use any accepted encryption scheme used by a digital wallet. If using a hosted custody service, as determined at 303, a hosted custody wallet is created, as illustrated at 304. The hosted custody wallet stores part of the private key, as illustrated at 305. The other or remaining part of the private key is stored securely in a related smart contract, as illustrated at 306, and is only conditionally available to the hosted custody wallet and provider thereof, for example expiry of the smart contract where the authorized user is unresponsive or has received an advance via a fiat payment.

Figure 4:
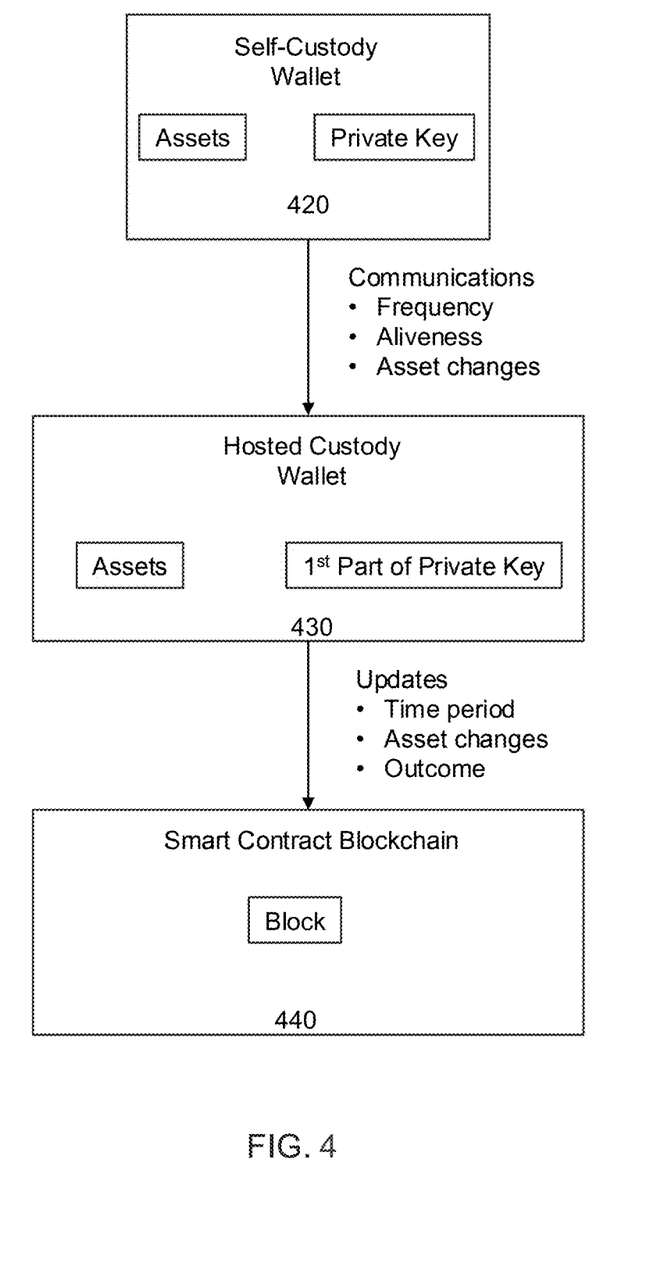
FIG. 4 illustrates example components according to an embodiment.

As shown in FIG. 4, self-custody wallet 420 stores encrypted keys to digital assets and its private key. Hosted custody wallet 430 mirrors self-custody wallet 420 by storing a copy of at least a portion of self-custody wallet 420, for example a copy of the first part of the private key as well as the encrypted asset data. Self-custody wallet 420 is associated with hosted custody wallet 430 by an application or control logic. The application regulates the behavior of self-custody wallet 420 and hosted custody wallet 430, for example setting forth communication conditions such as frequency of ping messages, an aliveness indicator, management of state changes such as changes to assets in self-custody wallet 420, or a combination of the foregoing. This permits host custody wallet 430 to interact with smart contract blockchain 440, storing the associated smart contract, for example to provide updates to timing (e.g., of expiry of smart contact), asset changes (e.g., amount or ownership of the original digital assets of self-custody wallet 420), and a chosen outcome, coded into the smart contract, for example as illustrated in FIG. 2A.

Figure 5:
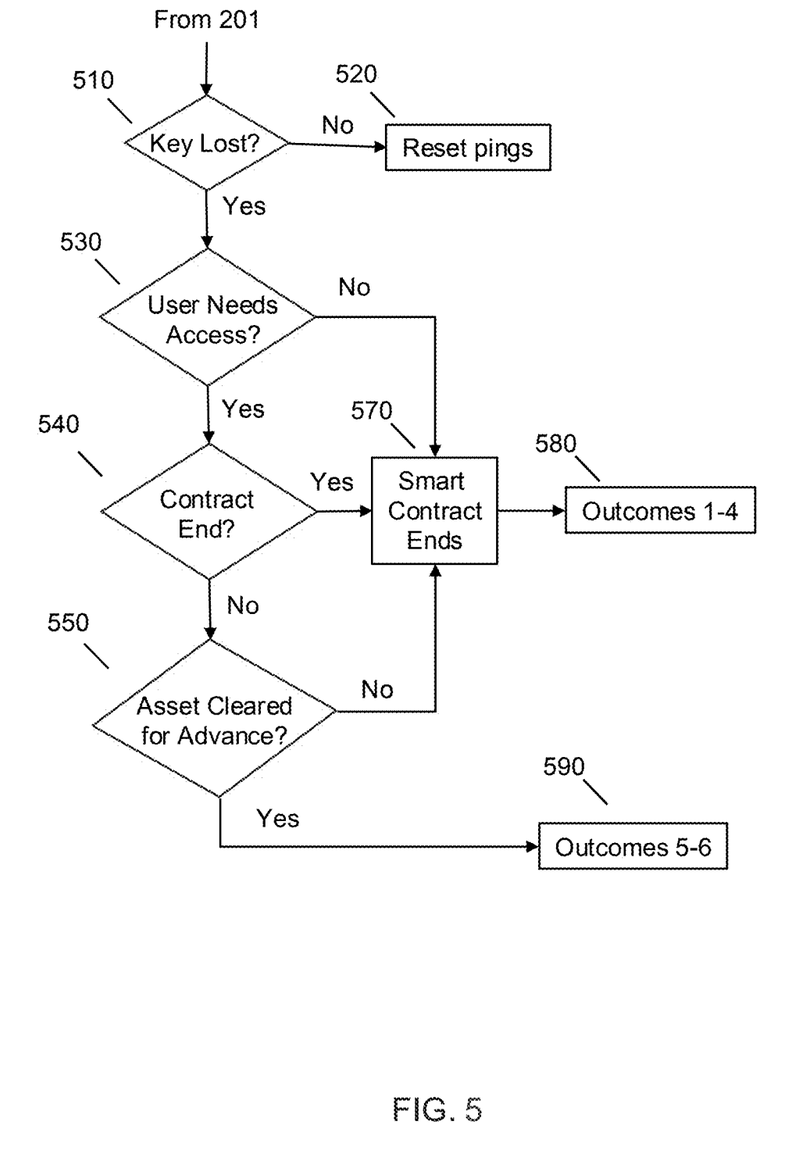
FIG. 5 illustrates an example method according to an embodiment.

Because one motivation to use a hybrid custody arrangement according to an embodiment is to secure access to digital assets in the event that an authorized user loses access to a self-custody wallet, FIG. 5 illustrates an example process that may be provided according to an embodiment for determining and handling key loss. As illustrated, following a determination of data that is indicative of lost access to or inaccessibility of self-custody wallet 120, for example as determined at step 201 of FIG. 2, an embodiment may determine if that self-custody wallet is inaccessible, for example confirm with the user via communication that the key is lost. If the key is not lost but a ping message was missed due to a network anomaly or some other consideration, then further action may be required to set the status quo, such as a reset of the ping timer in the smart contract as indicated at 520.

In the case that the key is lost, it may be determined whether the user needs access, as indicated at 530, and in turn whether the smart contract has ended or expired, as indicated at 540. As indicated in FIG. 5, if the user does not need access, the smart contract may be left to expire as defined, indicated at 570, following which any of the outcomes 1-4 may be implemented, as illustrated at 580. That is, the smart contract will expire and conditionally release the second part of the key, permitting key recovery, e.g., by host custody wallet 430, as illustrated in FIG. 4. Similarly, in a condition where it is determined that the key is lost at 520 and the user needs access at 530, if the contract has expired, the second part of the key is available for recovery as indicated at 580.

In a condition where the user has lost the key, as determined at 510, the user needs access, as determined at 530, and the contract has yet to expire, as determined at 540, then a check of whether the user account or assets thereof are cleared for an advance, as indicated at 550. In this case, if the asset(s) have been cleared for an advance, outcomes 5-6 may be utilized, i.e., custody service provider or partner thereof may provide an advance. In some cases, the advance may take the form of an alternative asset, such as fiat money that is provided at a discounted amount. In contrast, if the asset is not cleared for an advance, then the contract may await expiration, as indicated at 570, where one of outcomes 1-4 may be pursued.

Figure 6:
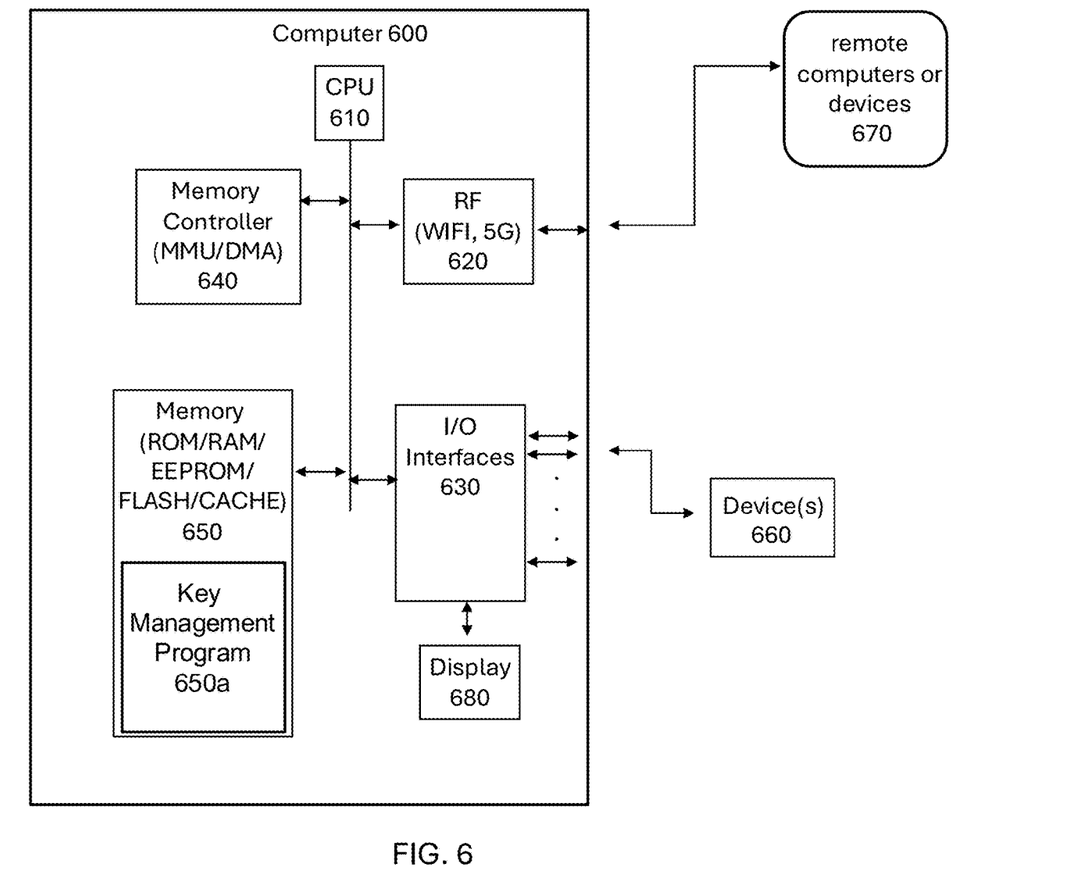
FIG. 6 illustrates a diagram of example system components according to an embodiment.

Referring to FIG. 6, it will be readily understood that certain embodiments can be implemented using any of a wide variety of devices or combinations of devices and components. In FIG. 6 an example of a computer 600 and its components are illustrated, which may be used in a device such as processing component 150 of a host custody service provider for implementing the functions or acts described herein, e.g., executing a key management program 650a implementing acts or subsets thereof of FIG. 2, FIG. 3, and FIG. 5. Also, circuitry other than that illustrated in FIG. 6 may be utilized in one or more embodiments. The example of FIG. 6 includes certain functional blocks, as illustrated, which may be integrated onto a single semiconductor chip to meet specific application requirements.

One or more processing units are provided, which may include a central processing unit (CPU) 610, one or more graphics processing units (GPUs), and/or micro-processing units (MPUs), which include an arithmetic logic unit (ALU) that performs arithmetic and logic operations, instruction decoder that decodes instructions and provides information to a timing and control unit, as well as registers for temporary data storage. CPU 610 may comprise a single integrated circuit comprising several units, the design and arrangement of which vary according to the architecture chosen.

Computer 600 also includes a memory controller 640, e.g., comprising a direct memory access (DMA) controller to transfer data between memory 650 and hardware peripherals. Memory controller 640 includes a memory management unit (MMU) that functions to handle cache control, memory protection, and virtual memory. Computer 600 may include controllers for communication using various communication protocols (e.g., I$^2$C, USB, etc.).

Memory 650 may include a variety of memory types, volatile and nonvolatile, e.g., read only memory (ROM), random access memory (RAM), electrically erasable programmable read only memory (EEPROM), Flash memory, and cache memory. Memory 650 may include embedded programs, code, and downloaded software, e.g., key management program 650a that provides coded methods such as illustrated and described in connection with FIGS. 2, 3 and 5 (or parts thereof). By way of example, and not limitation, memory 650 may also include an operating system, application programs, other program modules, code, and program data, which may be downloaded, updated, or modified via remote devices.

A system bus permits communication between various components of the computer 600. I/O interfaces 630 and radio frequency (RF) devices 620, e.g., Wi-Fi and telecommunication radios, may be included to permit computer 600 to send data to and receive data from remote devices using wireless mechanisms, noting that data exchange interfaces for wired data exchange may be utilized. Computer 600 may operate in a networked or distributed environment using logical connections to one or more other remote computers or devices 670, such as a set of devices that implements a distributed ledger, such as smart contract blockchain 140. The logical connections may include a network, such local area network (LAN) or a wide area network (WAN) but may also include other networks/buses. For example, computer 600 may communicate data with and between device(s) 660, for example personal user device(s) that provide communication and data connectivity to self-custody wallet 120.

Computer 600 may therefore execute program instructions or code configured to provide hosted custody wallet, smart contracts, and perform other functionality of the embodiments, such as described in connection with FIGS. 2, 3 and 5 (or parts thereof). A user can interface with (for example, enter commands and information) the computer 600 through input devices, which may be connected to I/O interfaces 630. A display 680 or other type of output device may be connected to or integrated with the computer 600, for example via an interface selected from I/O interfaces 630.

It should be noted that the various functions described herein may be implemented using instructions or code stored on a memory, e.g., memory 650, that are transmitted to and executed by a processor, e.g., CPU 610. Computer 600 includes one or more storage devices that persistently store programs and other data. A storage device or computer readable medium, as used herein, is a non-transitory computer readable medium. Some examples of a non-transitory computer readable medium include, but are not limited to, storage integral to computer 600, such as memory 650, a hard disk or a solid-state drive, and removable storage, such as an optical disc or a memory stick.

Program code stored in a memory or storage device may be transmitted using any appropriate transmission medium, including but not limited to wireless, wireline, optical fiber cable, RF, or any suitable combination of the foregoing.

Program code for carrying out operations according to various embodiments may be written in any combination of one or more programming languages. The program code may execute entirely on a single device, partly on a single device, as a stand-alone software package, partly on single device and partly on another device, or entirely on the other device. In an embodiment, program code may be stored in a non-transitory medium and executed by a processor to implement functions or acts specified herein. In some cases, the devices referenced herein may be connected through any type of connection or network, including a local area network (LAN) or a wide area network (WAN), or the connection may be made through other devices (for example, through the Internet using an Internet Service Provider), through wireless connections using a mobile network, or through a hard wire connection, such as over a USB connection.

An embodiment may be implemented in a variety of devices, including user devices such as mobile user device running a mobile wallet application. It should therefore be understood that in an embodiment, computer 600 may take the form of a mobile phone having a suitable self-custody wallet program, e.g., including components of key management program 650a, permitting interaction with hosted custody wallet 430, smart contract blockchain, or a combination of the foregoing.

Therefore, an embodiment may include an application program configured to execute computer program instructions, for example as outlined at least in part in FIGS. 2, 3, and 5, which in combination with device hardware such as a processor and non-transitory memory storing code, permit realization of private key management as described herein.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" or "the" preceding an element does not exclude the presence of a plurality of such elements. The mere fact that certain elements are recited in mutually different dependent claims does not indicate that these elements cannot be used in combination. The word "about" or similar relative term as applied to numbers includes ordinary (conventional) rounding of the number with a fixed base such as 5 or 10.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized or omitted as appropriate, as the explicit illustrated examples are used only for descriptive purposes and are not to be construed as limiting.

As used herein, the statement that two or more parts or components are "coupled" shall mean that the parts are joined or operate together either directly or indirectly, e.g., through one or more intermediate parts or components, so long as a link occurs. As used herein, "operatively coupled" means that two or more elements are coupled to operate together or are in communication, unidirectional or bidirectional, with one another. As used herein, the term "number" shall mean one or an integer greater than one (i.e., a plurality). As used herein a "set" shall mean one or more.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method, comprising:
  providing, using a set of one or more processors, a hosted digital wallet that mirrors at least a portion of data of a user digital wallet, the hosted digital wallet comprising first data indicative of a first portion of a private key;
  associating, using the set of one or more processors, the hosted digital wallet with a smart contract storing second data indicative of at least the remainder of the private key that is not the first portion of the private key stored in the hosted digital wallet;
  determining, using the set of one or more processors, that the user digital wallet is not compliant with one or more predetermined conditions specified via the smart contract;
  obtaining, using the set of one or more processors, a response to a request from a third-party before releasing the remainder of the private key;
  obtaining, using the set of one or more processors, the second data indicative of at least the remainder of the private key from the smart contract; and
  recovering, using the set of or more processors, the private key using the first data and second data.

2. The method of claim 1, wherein the third-party is a service acting as a proxy for the user and configured to respond to a request specified in the smart contract.

3. The method of claim 2, wherein the response from the third party comprises a release secret.

4. The method of claim 3, comprising, providing one or more assets prior to the expiration time of the smart contract.

5. The method of claim 4, wherein the one or more assets are data proving ownership of a type of cryptocurrency.

6. The method of claim 4, comprising recovering the one or more assets into the hosted digital wallet after the expiration time of the smart contract.

7. The method of claim 1, wherein the determining that the user digital wallet is not compliant with one or more predetermined conditions specified via the smart contract comprises determining that a predefined communication is not received.

8. The method of claim 7, wherein the determining that a predefined communication is not received indicates the user digital wallet is inaccessible.

9. The method of claim 8, wherein the user digital wallet is inaccessible due to an inability to obtain a copy of the private key.

10. The method of claim 1, wherein the third-party tracks use of services by a user associated with the user digital wallet to indicate aliveness.

11. A system, comprising:
  a set of one or more processors; and
  a non-transitory storage device comprising code executable by the set of one or more processors, the code being configurable for:
    providing a hosted digital wallet that mirrors at least a portion of data of a user digital wallet, the hosted digital wallet comprising first data indicative of a first portion of a private key;

associating, using the set of one or more processors, the hosted digital wallet with a smart contract storing second data indicative of at least the remainder of the private key that is not the first portion of the private key stored in the hosted digital wallet;

determining, using the set of one or more processors, that the user digital wallet is not compliant with one or more predetermined conditions specified via the smart contract;

obtaining, using the set of one or more processors, a response to a request from a third-party before releasing the remainder of the private key;

obtaining, using the set of one or more processors, the second data indicative of at least the remainder of the private key from the smart contract; and recovering, using the set of one or more processors, the private key using the first data and second data.

12. The system of claim 11, wherein the third-party is a service acting as a proxy for the user and configured to respond to a request specified in the smart contract.

13. The system of claim 12, wherein the third-party response comprises a release secret.

14. The system of claim 13, wherein the code is configurable for providing one or more assets prior to the expiration time of the smart contract.

15. The system of claim 14, wherein the one or more assets are data proving ownership of a type of cryptocurrency.

16. The system of claim 14, wherein the code is configurable for recovering the one or more assets into the hosted digital wallet after the expiration time of the smart contract.

17. The system of claim 11, wherein the code configurable for determining that the user digital wallet is not compliant with one or more predetermined conditions specified via the smart contract comprises code configurable to determine that a predefined communication is not received.

18. The system of claim 17, wherein the code configurable to determine that a predefined communication is not received indicates the user digital wallet is inaccessible.

19. The system of claim 11, wherein the third-party tracks use of services by a user associated with the user digital wallet to indicate aliveness.

20. A computer program product, comprising:
a non-transitory medium comprising code executable by a set of one or more processors, the code being configurable for:
providing, using a set of one or more processors, a hosted digital wallet that mirrors at least a portion of data of a user digital wallet, the hosted digital wallet comprising first data indicative of a first portion of a private key;

associating, using the set of one or more processors, the hosted digital wallet with a smart contract storing second data indicative of at least the remainder of the private key that is not the first portion of the private key stored in the hosted digital wallet;

determining, using the set of one or more processors, that the user digital wallet is not compliant with one or more predetermined conditions specified via the smart contract;

obtaining, using the set of one or more processors, a response to a request from a third-party before releasing the remainder of the private key;

obtaining, using the set of one or more processors, the second data indicative of at least the remainder of the private key from the smart contract; and recovering, using the set of one or more processors, the private key using the first data and second data.

\* \* \* \* \*